United States Patent [19]

Kozakai et al.

[11] Patent Number: 5,204,435
[45] Date of Patent: Apr. 20, 1993

[54] OPTICAL FIBERS AND CORE-FORMING COMPOSITIONS

[75] Inventors: Shohei Kozakai, Annaka; Yoshinori Hida, Kawasaki; Hideki Asano, Mito; Tomiya Abe, Hitachi, all of Japan

[73] Assignees: Shin-Etsu Chemical Co., Ltd.; Hitachi Cable, Ltd., both of Tokyo, Japan

[21] Appl. No.: 604,526

[22] Filed: Oct. 29, 1990

[30] Foreign Application Priority Data

Oct. 30, 1989 [JP] Japan .................................. 1-282751
Oct. 30, 1989 [JP] Japan .................................. 1-282752

[51] Int. Cl.$^5$ ............................................. C08G 77/06
[52] U.S. Cl. ....................................... 528/15; 428/364; 428/368; 525/478
[58] Field of Search .................... 528/15; 525/478; 428/364, 368

[56] References Cited

U.S. PATENT DOCUMENTS 4,609,590  9/1986  Suzuki et al. ........................ 528/32
4,755,577  7/1988  Suzuki et al. ........................ 528/32
4,923,746  5/1990  Balmisse et al. ................. 428/309.9

FOREIGN PATENT DOCUMENTS 60-43613  3/1985  Japan .

*Primary Examiner*—Melvyn I. Marquis
*Attorney, Agent, or Firm*—Birch, Stewart, Kolasch & Birch

[57] ABSTRACT

A composition comprising (a) an organopolysiloxane having a unit of the formula: $RSiO_{3/2}$ wherein R is a substituted or unsubstituted monovalent $C_{1-10}$ hydrocarbon group in its molecule and having at least 0.05 alkenyl groups each directly attached to a silicon atom per silicon atom, (b) an organohydrogenpolysiloxane having at least 2 hydrogen atoms each directly attached to a silicon atom per molecule, and (c) a platinum catalyst, maintains good light transmission in cured form when exposed to humidity or stresses and is thus suitable for forming cores of optical fibers.

26 Claims, 1 Drawing Sheet

OPTICAL FIBERS AND CORE-FORMING COMPOSITIONS

The present invention relates to an organopolysiloxane composition for use as core material for plastic optical fibers. It also relates to plastic optical fibers having a core in the form of a cured product of such a composition.

BACKGROUND OF THE INVENTION

As is well known in the art, optical fibers include glass base optical fibers using quartz glass and multi-component glass as core and clad components and plastic optical fibers using plastics as core and clad components. As compared with the former, the plastic optical fibers have some drawbacks including an increased transmission loss undesirable for long distance communications, but some advantages including an increase of numerical aperture, ease of handling, and low cost.

Conventional plastic optical fibers generally include cores formed of organic polymers having high light transmittance and clads formed of highly transparent organic polymers having a lower index of refraction than the core polymers. The organic polymers having high light transmittance suitable as the core are typically poly(methyl methacrylate) and polystyrene. It was recently proposed to use organopolysiloxane elastomers as the core material as disclosed in Japanese Patent Application Kokai No. 43613/1985. Plastic optical fibers using such elastomers as the core have advantages over those using poly(methyl methacrylate) and other conventional core materials because of higher flexibility and higher thermal resistance.

Nevertheless, the organopolysiloxane elastomers applied as the core of plastic optical fibers have a drawback in that light transmission loss is increased within a short period of time when exposed to high humidity conditions. If external pressure is applied to the optical fibers so as to compress them, then the light transmission loss is increased in proportion to the external stress. It is thus desired to eliminate these drawbacks.

SUMMARY OF THE INVENTION

Therefore, an object of the present invention is to provide a composition which cures into a product having a low light transmission loss even when exposed or subjected to high humidity or external stresses so that the composition is highly suitable for forming optical fiber cores.

The present inventors have found that when an organopolysiloxane composition comprising (a) an organopolysiloxane having a silsesquioxide unit of the formula:

$$RSiO_{3/2} \qquad (1)$$

wherein R is a substituted or unsubstituted monovalent hydrocarbon group having 1 to 10 carbon atoms in its molecule and having at least 0.05 alkenyl groups each directly attached to a silicon atom per silicon atom, (b) an organopolysiloxane having at least 2 hydrogen atoms each directly attached to a silicon atom per molecule, and (c) a platinum catalyst is cured, there is obtained a cured organopolysiloxane article having a hardness of at least 30 in Shore D hardness scale. Using this cured article as the core, there is obtained a plastic optical fiber which has a low light transmission loss at high humidity and experiences only a slight increase of light transmission loss when compressive stresses are applied. When the organopolysiloxane as component (a) further has a silanol group, and the silanol group in the organopolysiloxane is present in an amount of at least 0.02 mol per 100 grams of the total weight of components (a), (b) and (c), the resulting composition forms a cured article which experiences a minimal increase of light transmission loss when exposed to high humidity.

More particularly, in the organopolysiloxane composition before curing, the organopolysiloxane structure contains three-dimensional constitutional units, that is, $(RSiO_{3/2})$ units. For this reason, the organopolysiloxane composition cures into articles which are substantially harder than the conventional polysiloxane elastomers. Unless the three-dimensional constitutional units have been incorporated before curing, organopolysiloxane cured articles suitable for optical fibers and having a Shore D hardness of at least 30 cannot be obtained even if a three-dimensional structure is created during curing. By introducing a silanol group into component (a) or organopolysiloxane having three-dimensional constitutional units in the above-defined proportion, the composition is further improved in humidity resistance so that high light transmittance is maintained more stably against a change of humidity.

Therefore, the present invention provides a composition for forming optical fiber cores, comprising (a) an organopolysiloxane having a unit of the formula:

$$RSiO_{3/2} \qquad (1)$$

wherein R is a substituted or unsubstituted monovalent hydrocarbon group having 1 to 10 carbon atoms in its molecule and having at least 0.05 alkenyl groups each directly attached to a silicon atom per silicon atom, (b) an organopolysiloxane having at least 2 hydrogen atoms each directly attached to a silicon atom per molecule, and (c) a platinum base catalyst.

BRIEF DESCRIPTION OF THE DRAWING

The above and other objects, features, and advantages of the present invention will be better understood from the following description taken in conjunction with the accompanying drawing, in which.

the only FIGURE.

DETAILED DESCRIPTION OF THE INVENTION

Figure 1:
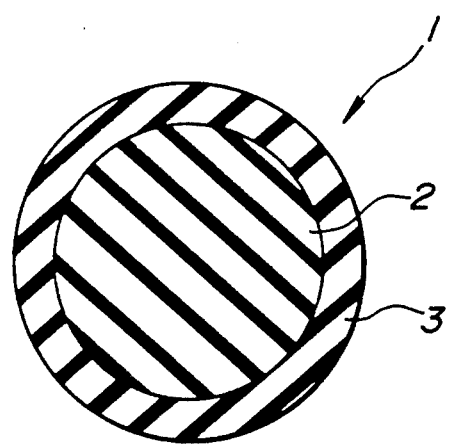
FIG. 1 is a cross section of an optical fiber according to the present invention.

Component (a) of the core-forming organopolysiloxane composition according to the present invention is an organopolysiloxane having a three dimensional constitutional unit of the formula:

$$RSiO_{3/2} \qquad (1)$$

in its molecule. The organopolysiloxane has at least 0.05 alkenyl groups each directly attached to a silicon atom per silicon atom. It preferably has a silanol group in addition to the alkenyl group.

In the three dimensional constitutional unit of formula (1), R is a substituted or unsubstituted monovalent hydrocarbon group having 1 to 10 carbon atoms, for example, alkyl groups such as methyl, ethyl and propyl; alkenyl groups such as vinyl, allyl and hexenyl; cycloalkyl groups such as cyclohexyl; aryl groups such as phenyl, tolyl, and xylyl; aralkyl groups such as benzyl and phenylethyl; and halogenated monovalent hydrocarbon groups such as tetrachlorophenyl, chlorophenyl, chloromethyl, pentafluorobutyl, and trifluoropropyl; with the methyl, phenyl and vinyl groups being preferred. The proportion of these substituents is not particularly limited. Preferably, the three dimensional constitutional units of formula (1) are contained in the organopolysiloxane or component (a) in a proportion of 30 to 80 mol %, more preferably 40 to 70 mol %. If the content of the three dimensional constitutional units in the organopolysiloxane or component (a) is less than 30 mol %, some cured articles will have a Shore D hardness of less than 30. If the same content exceeds 80 mol %, the composition would sometimes become too viscous, rendering fiber manufacture difficult or cured articles brittle.

The remaining constitutional units in the organopolysiloxane or component (a) include the following units:

$$\begin{array}{c} R^1 \\ | \\ (SiO) \\ | \\ R^2 \end{array} \qquad (2)$$

$$\begin{array}{c} R^1 \\ | \\ (R^2-SiO_{\frac{1}{2}}) \\ | \\ R^3 \end{array} \qquad (3)$$

$$(SiO_2) \qquad (4)$$

In formulae (2) to (4), $R^1$, $R^2$ and $R^3$ are the same as defined for R, that is, independently selected from substituted or unsubstituted monovalent hydrocarbon groups having 1 to 10 carbon atoms. The content of these constitutional units in the organopolysiloxane is preferably 20 to 70 mol % for unit (2) and 0 to 30 mol % for each of units (3) and (4).

The organopolysiloxane as component (a) cures through addition crosslinking reaction with the hydrogen atom directly attached to a silicon atom of the organopolysiloxane as component (b) in the presence of the platinum catalyst as component (c). Therefore, the organopolysiloxane as component (a) should contain alkenyl groups each directly attached to a silicon atom, for example, vinyl, allyl and acryl groups in such an amount that at least 0.05 alkenyl groups, preferably at least 0.15 alkenyl groups are present per silicon atom. Outside the range, curing is retarded and/or cured articles have a Shore D hardness of less than 30.

For humidity resistance improvement, the organopolysiloxane as component (a) preferably has a silanol group ($\equiv$SiOH) in an amount of at least 0.02 mol, more preferably at least 0.04 mol per 100 grams of the total weight of components (a), (b) and (c). If the content of silanol group is less than 0.02 mol on this basis, optical fibers using cured articles of the composition as the core would sometimes fail to maintain light transmission properties against changes in humidity and temperature. The upper limit of the silanol group content need not be definitely determined although the upper limit is preferably 0.5 mol, more preferably 0.2 mol per 100 grams of the total weight of components (a), (b) and (c).

Examples of the organopolysiloxane as component (a) includes those of the following average compositional formulae.

[MeSiO$_{3/2}$]$_a$[MeViSiO]$_b$
[PhSiO$_{3/2}$]$_a$[MeViSiO]$_b$
[PhSiO$_{3/2}$]$_a$[MeSiO$_{3/2}$]$_{b[MeViSiO]c}$
[PhSiO$_{3/2}$]$_a$[ViSiO$_{3/2}$]$_{b[Me_2SiO]c}$
[PhSiO$_{3/2}$]$_a$[MeViSiO]$_{b[MePhSiO]c}$
[PhSiO$_{3/2}$]$_a$[MeViSiO]$_{b[Me_3SiO_{1/2}]c}$[SiO$_2$]$_d$
[PhSiO$_{3/2}$]$_a$[MeViSiO]$_{b[ViMe_2SiO_{1/2}]c}$[SiO$_2$]$_d$
[MeSiO$_{3/2}$]a[MeViSiO]$_{b[HO_{1/2}]c}$
[PhSiO$_{3/2}$]a[MeViSiO]$_{b[HO_{1/2}]c}$
[PhSiO$_{3/2}$]$_a$[MeSiO$_{3/2}$]$_{b[MeViSiO]c}$[HO$_{1/2}$]$_d$
[PhSiO$_{3/2}$]$_a$[ViSiO$_{3/2}$]$_{b[Me_2SiO]c}$[HO$_{1/2}$]$_e$
[PhSiO$_{3/2}$]$_a$[MeViSiO]$_{b[MePhSiO]c}$[HO$_{1/2}$]$_e$
[PhSiO$_{3/2}$]$_a$[MeViSiO]$_{b[Me_3SiO_{1/2}]c}$[SiO$_2$]$_{d[HO_{1/2}]d}$
[PhSiO$_{3/2}$]a[MeViSiO]$_{b[ViMe_2SiO2]c}$[SiO$_2$]$_{e[HO_{1/2}]d}$

In the formulae, Me is methyl, Vi is vinyl, Ph is phenyl, letters a through e are positive numbers of less than 1, and the sum of letters a through e is equal to 1.0.

These organopolysiloxanes may be prepared by well-known techniques by co-hydrolysis of organohalosilanes or organoalkoxysilanes corresponding to the respective constitutional units in the above-listed formulae.

This co-hydrolysis method produces, of necessity, a substantial amount of silanol groups although introduction of a silanol group in the limited proportion is effective in improving the humidity resistance of optical fibers as previously described. The amount of silanol groups generated can be controlled by various methods. For example, the amount of silanol groups can be reduced by converting them into siloxane bonds through alkali catalyzed condensation between silanol groups according to the following reaction scheme.

$$\equiv SiOH + HOSi \equiv \longrightarrow \equiv SiOSi \equiv$$

Also, the amount of silanol groups can be reduced by silylation using a silylating agent such as hexamethylsilazane according to the following reaction scheme.

$$2\equiv SiOH + (CH_3)_3SiNHSi(CH_3)_3 \rightarrow 2\equiv Si\text{-}OSi(CH_3)_3 + NH_3 \uparrow$$

Alternatively, the amount of silanol groups can be controlled by mixing in a proper proportion those organopolysiloxanes having the silanol group content minimized by either of the above-mentioned methods with those organopolysiloxanes prepared by the co-hydrolysis method having a substantial amount of silanol groups.

Component (b) of the core-forming organopolysiloxane composition according to the present invention is an organopolysiloxane having at least 2 hydrogen atoms each directly attached to a silicon atom per molecule, that is, an organohydrogensiloxane. Component (b) is a component for forming a cured product through addition crosslinking reaction with the alkenyl groups in the organopolysiloxane as component (a). The proportion of the alkenyl group in the component (a) organopolysiloxane to the hydrogen atom directly attached to a silicon atom in the component (b) organopolysiloxane is not particularly limited insofar as the curing purpose is accomplished. The proportion preferably ranges from 10/1 to 1/10, more preferably from 5/1 to 1/5 in a molar ratio.

In the organopolysiloxane as component (b), the organic group other than the hydrogen atom and attached to a silicon atom is not particularly limited insofar as it is monovalent, with substituted or unsubstituted monovalent hydrocarbon groups being preferred. Examples of the substituted or unsubstituted monovalent hydrocarbon groups include alkyl groups, aralkyl groups, and halogenated monovalent hydrocarbon groups as previously described for R in component (a), more preferably methyl and phenyl groups.

The organopolysiloxane as component (b) is typically an organohydrogensiloxane of the general formula:

$$R^4{}_b H_c SiO_{(4-b-c)/2}$$

wherein $R^4$ is a substituted or unsubstituted monovalent hydrocarbon group having 1 to 10 carbon atoms as previously defined for R, letters b and c are positive numbers, and the sum of b+c is equal to 1.0 to 3.0, and having at least two silicon-to-hydrogen bonds. The substituents represented by $R^4$ are preferably selected from an alkyl group such as methyl, ethyl, propyl and butyl, an aryl group such as phenyl and tolyl, and a 3,3,3 trifluoropropyl group. The organohydrogensiloxane as component (b) should have at least two silicon-to-hydrogen bonds ($\equiv$Si—H) capable of reacting with the alkenyl groups of the organopolysiloxane as component (a). Those organohydrogensiloxanes having a degree of polymerization of up to 300 are preferred.

The molecular structure of the organopolysiloxane as component (b) is not particularly limited insofar as it is compatible with the organopolysiloxane as component (a). It may have any of well-known linear, cyclic and branched network structures. It may have a viscosity ranging from a low value of less than 10 centistokes to a high value of more than 1000 centistokes. Since less viscous organopolysiloxane compositions are convenient for the manufacture of optical fibers, the organopolysiloxane as component (b) should preferably have a low viscosity of up to 1000 centistokes so that the overall composition has a relatively low viscosity.

Examples of the organopolysiloxane as component (b) are given below.

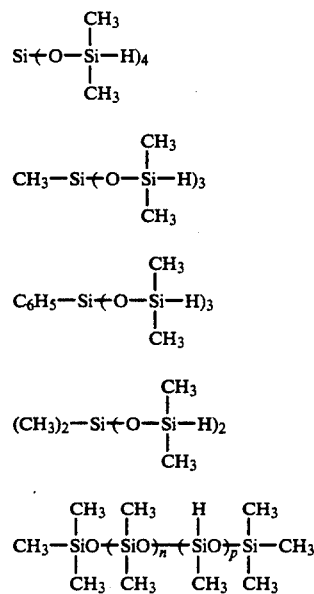

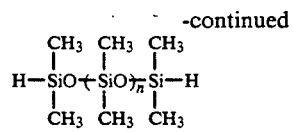

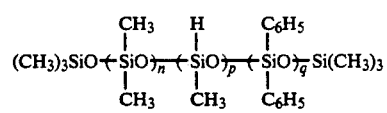

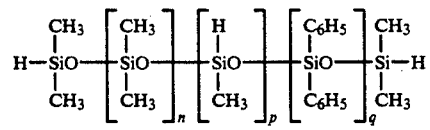

$$(HR^5{}_2SiO_{\frac{1}{2}})_s(SiO_2)_t$$

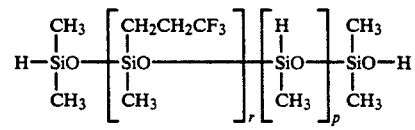

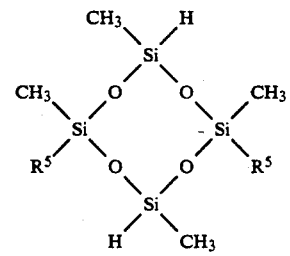

In the above formulae, s and t are positive numbers and the sum of s+t is equal to 1; $R^5$ is hydrogen, a monovalent $C_{1-8}$ hydrocarbon group such as alkyl and aryl groups, or a triorganosiloxy group such as a trimethylsiloxy group, n, p, q and r are integers, $n \geq 0$, $p \geq 2$, $q \geq 0$, and $r \geq 0$, and n, n+p, n+p+q, and r+q are preferably equal to 4 to 300.

Component (c) of the core-forming organopolysiloxane composition according to the present invention is a platinum catalyst for promoting the formation of cross-linking bonds through addition reaction between silicon-bonded alkenyl groups in the organopolysiloxane as component (a) and silicon-bonded hydrogen atoms in the organopolysiloxane as component (b), thereby reducing the curing time. Platinum black and chloroplatinic acid are typical examples of the platinum base catalyst. In order that the catalyst be dissolved in the organopolysiloxanes, use of alcohol and silicone modified solutions of chloroplatinic acid is preferred. The platinum catalyst as component (c) is used in a catalytic amount. Since the platinum left in the core can adversely affect the light transmission loss of optical fibers, the amount of platinum catalyst should be as small as possible. Thus the platinum catalyst is preferably used in an amount to give 5 ppm or less, more preferably 0.01 to 1 ppm or less of elemental platinum based on the total weight of components (a) and (b). Less than 0.01 ppm would be too small for effective curing.

The core-forming organopolysiloxane composition according to the present invention is comprised of components (a), (b) and (c) as defined above. In a composition prepared by mixing these components, due to the catalysis of the platinum catalyst as component (c), addition reaction between components (a) and (b) can take place even at room temperature and this addition reaction proceeds quickly at elevated temperatures. In this respect, a reaction inhibitor may be added if desired for ease of working. Examples of the reaction inhibitor include acetylene alcohols, 3-methyl-3-butyn-2-ol, 2-methyl-1-pentyl-3-ol, 3,5-dimethyl-1-hexyn-3-ol, 2,5-dimethyl 3-hexyne-2,5-diol, 3,6-dimethyl-4-octyne-3,6-diol, and 2,4,7,9.tetramethyl-5-decyne-4,7-diol. The amount of the inhibitor added is not particularly limited and may be suitably selected for a particular set of working conditions although it is generally added in an amount of 0.01 to 1 part per 100 parts by weight of the total of components (a) and (b).

The core-forming composition of the invention is molded into a fibrous shape by conventional well-known techniques as by simply mixing the components and introducing into a tube under pressure, and then heated for curing to produce an optical fiber core. The preferred curing conditions include a temperature of about 100° to about 150° C. and a time of about 3 hours or longer.

One embodiment of the optical fiber according to the present invention is shown in the cross section of FIG. 1. The optical fiber 1 has a core 2 of a circular cross section and a concentric clad 3 enclosing the core. The core 2 is a cured one of the composition of the invention. The clad 3 may be formed from any desired one of well-known plastic materials, for example, fluorinated polymers such as polytetrafluoroethylene, tetrafluoroethylene/perfluoroalkylvinylether copolymers, tetrafluoroethylene/hexafluoropropylene copolymers, polychlorotrifluoroethylene, tetrafluoroethylene/ethylene copolymers, polyvinyl fluoride, polyvinylidene fluoride, and tetrafluoroethylene/vinylidene fluoride copolymers, polyamide resins, polyimide resins, polyamidimide resins, epoxy resins, polyvinyl chloride resins, and polyesters.

The silicone type plastic optical fibers having a core in the form of a cured product of the composition of the present invention experience a minimal rise of light transmission loss when exposed to high humidity or external stresses. The ability to maintain a high light transmittance stably against humidity changes and external stresses, together with inherent flexibility and thermal resistance, widens the range of application of plastic optical fibers.

EXAMPLE

Examples of the present invention are given below together with comparative examples by way of illustration and not by way of limitation. All parts are by weight.

EXAMPLE 1

An organopolysiloxane composition was prepared by mixing 100 parts of a vinyl-containing organopolysiloxane of compositional formula (A) and 23 parts of an organohydrogenpolysiloxane having a hydrogen atom attached to a silicon atom of formula (B) and adding an octyl alcohol modified solution of chloroplatinic acid to the mixture in an amount to give 1 ppm of elemental platinum based on the weight of the mixture.

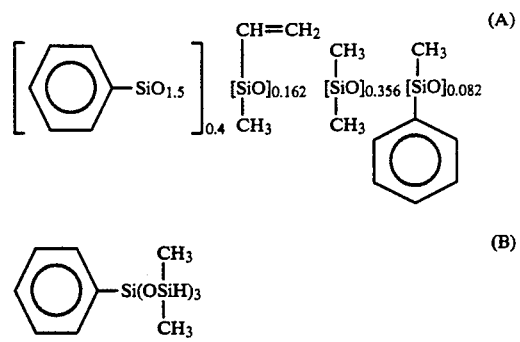

EXAMPLE 2

An organopolysiloxane composition was prepared by mixing 100 parts of a vinyl-containing organopolysiloxane of compositional formula (C) and 25 parts of the organohydrogenpolysiloxane of formula (B) used in Example 1 and adding an octyl alcohol modified solution of chloroplatinic acid to the mixture in an amount to give 1 ppm of elemental platinum based on the weight of the mixture.

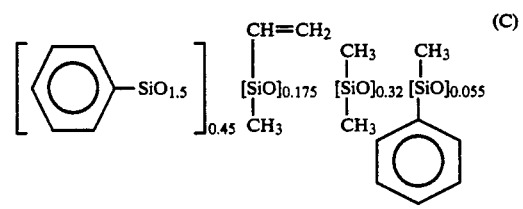

EXAMPLE 3

An organopolysiloxane composition was prepared by mixing 100 parts of a vinyl-containing organopolysiloxane of compositional formula (D) and 34 parts of the organohydrogenpolysiloxane of formula (B) used in Example 1 and adding an octyl alcohol modified solution of chloroplatinic acid to the mixture in an amount to give 1 ppm of elemental platinum based on the weight of the mixture.

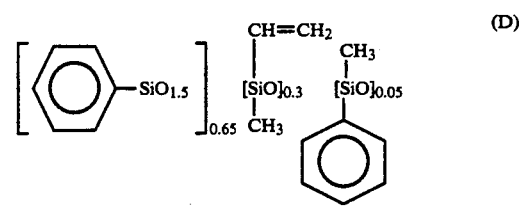

Examples 4 and 5 are outside the scope of the present invention.

EXAMPLE 4

An organopolysiloxane composition was prepared by mixing 100 parts of a vinyl-containing organopolysiloxane of the compositional formula (E) and 21 parts of the organohydrogenpolysiloxane of formula (B) used in Example 1 and adding an octyl alcohol modified solution of chloroplatinic acid to the mixture in an amount to give 1 ppm of elemental platinum based on the weight of the mixture.

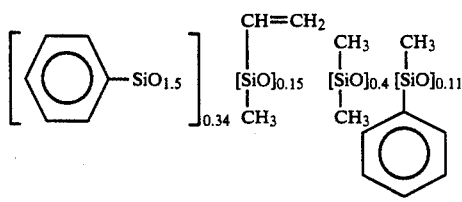

(E)

EXAMPLE 5

An organopolysiloxane composition was prepared by mixing 100 parts of a dimethylpolysiloxane blocked with a dimethylvinylsiloxy group at each end and having a viscosity of 60 centistokes at 25° C. and 14.3 parts of a methylhydrogenpolysiloxane having at least 3 silicon-bonded hydrogen atoms in its molecule of average formula (F) and adding an octyl alcohol modified solution of chloroplatinic acid to the mixture in an amount to give 1 ppm of elemental platinum based on the weight of the mixture.

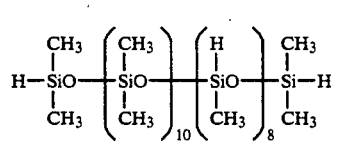

(F)

The organopolysiloxane compositions of Examples 1–5 were then formed into sheets of 6 mm thick and cured at 150° C. for 3 hours. The cured sheets were measured for hardness.

Separately, the organopolysiloxane compositions of Examples 1–5 were forcedly introduced into fluoride resin tubes having an inner diameter of 1.5 mm and an outer diameter of 2.2 mm, and cured therein by heating at 150° C. for 3 hours, obtaining optical fibers.

Humidity resistance

The optical fibers were subjected to a humidity test by exposing the fibers to a humid environment at 40° C. and RH 90% for 24 hours and then allowing them to stand at room temperature for 2 hours. Using light at 660 nm, the quantity of light transmitted by the fibers was measured to determine a change of light quantity before and after humidity exposure.

TABLE 1

|  | Shore D hardness | Light quantity retention after humidity exposure @40° C./RH90%/24 hr., % |
|---|---|---|
| Example 1 | 35 | 93 |
| Example 2 | 62 | 101 |
| Example 3 | 82 | 100 |
| Example 4* | 25 | 87 |
| Example 5* | 51 (JIS A hardness) | 84 |

*outside the scope of the invention

The optical fibers prepared using the compositions of Examples 3, 4 and 5 were subjected to another humidity test by exposing the fibers to a humid environment at 60° C. and RH 90% for 24 hours and then allowing them to stand at room temperature for 2 hours. Using light at 660 nm, the quantity of light transmitted by the fibers was measured to determine a change of light quantity before and after humidity exposure. The optical fiber of Example 3 retained 85% of the initial light quantity after humidity exposure, whereas the optical fibers of (Comparative) Examples 4 and 5 became almost opaque to light as demonstrated by a light quantity retention of 0.0002% and 0.00%, respectively.

Pressure resistance

The optical fibers prepared using the compositions of Examples 1–5 were subjected to a stress test by applying a compressive external force to an intermediate 50 mm area of the fibers. The quantity of light transmitted by the fibers was measured to determine a change of light quantity before and after load application.

TABLE 2

|  | Example 1 | Example 2 | Example 3 | Example 4* | Example 5* |
|---|---|---|---|---|---|
| Shore D hardness | 35 | 62 | 82 | 25 | 51 (JIS A) |
| Load (kg) versus light quantity retention (%) | | | | | |
| 0 kg | 100 | 100 | 100 | 100 | 100 |
| 10 kg | 98 | 98 | 100 | 94 | 90 |
| 20 kg | 96 | 97 | 100 | 88 | 82 |
| 30 kg | 94 | 96 | 100 | 83 | 72 |
| 40 kg | 92 | 95 | 100 | 77 | 65 |
| 50 kg | 89 | 93 | 100 | 73 | 60 |
| 60 kg | 87 | 92 | 100 | 69 | 55 |
| 70 kg | 85 | 90 | 99 | 66 | 50 |
| 80 kg | 83 | 89 | 98 | 63 | 45 |
| 90 kg | 81 | 87 | 97 | 61 | 42 |
| 100 kg | 79 | 86 | 96 | 58 | 35 |

EXAMPLE 6

An organopolysiloxane composition was prepared by mixing 58.04 parts of a vinyl-containing organopolysiloxane of formula (G), 22.52 parts of a vinyl-containing organopolysiloxane of formula (H), and 19.44 parts of the organohydrogenpolysiloxane of formula (B) used in Example 1 and adding an octyl alcohol modified solution of chloroplatinic acid to the mixture in an amount to give 1 ppm of elemental platinum based on the weight of the mixture.

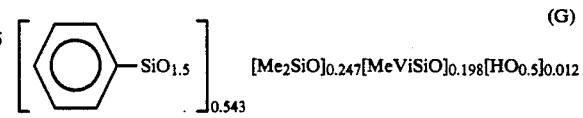

(G)

Me: methyl,
Vi: vinyl

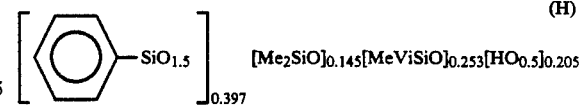

(H)

EXAMPLE 7

An organopolysiloxane composition was prepared by mixing 66.34 parts of the vinyl-containing organopolysiloxane of formula (G), 15.01 parts of the vinyl-containing organopolysiloxane of formula (H) used in Example 6, and 18.65 parts of the organohydrogenpolysiloxane of formula (B) used in Example 1 and adding an octyl alcohol modified solution of chloroplatinic acid to the mixture in an amount to give 1 ppm of elemental platinum based on the weight of the mixture.

EXAMPLE 8

An organopolysiloxane composition was prepared by mixing 78.03 parts of the vinyl-containing organopolysiloxane of formula (G), 4.43 parts of the vinyl-containing organopolysiloxane of formula (H) used in Example 6, and 17.54 parts of the organohydrogenpolysiloxane of formula (B) used in Example 1 and adding an octyl alcohol modified solution of chloroplatinic acid to the mixture in an amount to give 1 ppm of elemental platinum based on the weight of the mixture.

EXAMPLE 9

An organopolysiloxane composition was prepared by mixing 82.92 parts of the vinyl-containing organopolysiloxane of formula (G) used in Example 6 and 17.08 parts of the organohydrogenpolysiloxane of formula (B) used in Example 1 and adding an octyl alcohol modified solution of chloroplatinic acid to the mixture in an amount to give 1 ppm of elemental platinum based on the weight of the mixture.

The organopolysiloxane compositions of Examples 6–9 were then formed into sheets of 6 mm thick and cured at 150° C. for 3 hours. The cured sheets were measured for hardness.

Separately, the organopolysiloxane compositions of Examples 6.9 were forcedly introduced into fluoride resin tubes having an inner diameter of 1.5 mm and an outer diameter of 2.2 mm, and cured therein by heating at 150° C. for 3 hours, obtaining optical fibers.

Humidity resistance

The optical fibers were subjected to a humidity test by exposing the fibers to a humid environment at 60° C. and RH 90% for 72 hours and then allowing them to stand at room temperature for 2 hours. Using light at 660 nm, the quantity of light transmitted by the fibers was measured to determine a change of light quantity before and after humidity exposure.

The results are shown in Table 3.

TABLE 3

| Example | Composition (a) (G) | (a) (H) | (b) (B) | Silanol concentration* (mol/100 g) | Shore D hardness | Light quantity retention after humidity exposure @60° C./RH90%/72 hr., % |
|---|---|---|---|---|---|---|
| 6 | 58.04 | 22.52 | 19.44 | 0.061 | 77 | 92 |
| 7 | 66.34 | 15.01 | 18.65 | 0.043 | 78 | 91 |
| 8 | 78.03 | 4.43 | 17.54 | 0.020 | 77 | 65 |
| 9 | 82.92 | — | 17.08 | 0.0083 | 79 | 0 |

*the concentration of silanol groups in the organopolysiloxane composition

We claim:

1. A composition for forming an optical fiber core in which light is transmitted, comprising
   (a) an organopolysiloxane having a unit of the formula:

$$RSiO_{3/2} \quad (1)$$

wherein R is a substituted or unsubstituted monovalent hydrocarbon group having 1 to 10 carbon atoms in the molecule thereof and having at least 0.05 alkenyl groups each directly attached to a silicon atom per silicon atom, in a proportion of 30 to 80 mol %,
   (b) an organopolysiloxane having at least 2 hydrogen atoms each directly attached to a silicon atom per molecule, and
   (c) a platinum catalyst, said composition having the capability of being cured into a cured product having a hardness of at least 30 in Shore D hardness scale.

2. The composition of claim 1 wherein the organopolysiloxane of component (a) further has a silanol group, wherein said silanol group is present in the organopolysiloxane in an amount of at least 0.02 mol per 100 grams of the total weight of components (a), (b) and (c).

3. An optical fiber comprising an optical fiber core in the form of a cured product of the composition as set forth in claim 1 or 2.

4. The composition of claim 1 wherein R is alkyl, alkenyl, cycloalkyl, aryl, aralkyl or halogenated monovalent hydrocarbon.

5. An optical fiber comprising an optical fiber core in the form of a cured product of the composition as set forth in claim 4.

6. The composition of claim 1 wherein R is methyl, ethyl, propyl, vinyl, allyl, hexenyl, cyclohexyl, phenyl, tolyl, xylyl, benzyl, phenylethyl, tetrachlorophenyl, chlorophenyl, chloromethyl, pentafluorobutyl or trifluoropropyl.

7. An optical fiber comprising an optical fiber core in the form of a cured product of the composition as set forth in claim 6.

8. The composition of claim 1 wherein the organopolysiloxane of component (a) additionally comprises the following units

 (2)

 (3)

and $$(SiO_2) \quad (4)$$

in which in formulae (2) to (4), $R^1$, $R^2$ and $R^3$ are each the same as defined for R.

9. An optical fiber comprising an optical fiber core in the form of a cured product of the composition as set forth in claim 8.

10. The composition of claim 1 wherein the organopolysiloxane of component (b) comprises an organohydrogensiloxane of the general formula:

$$R^4{}_bH_cSiO_{(4-b-c)/2}$$

wherein $R^4$ is a substituted or unsubstituted monovalent hydrocarbon group having 1 to 10 carbon atoms, letters b and c are positive numbers, and the sum of b+c is equal to 1.0 to 3.0, and having at least two silicon-to hydrogen bonds.

11. An optical fiber comprising an optical fiber core in the form of a cured product of the composition as set forth in claim 10.

12. The composition of claim 10 wherein $R^4$ is alkyl, aryl or 3,3,3-trifluoropropyl.

13. An optical fiber comprising an optical fiber core in the form of a cured product of the composition as set forth in claim 12.

14. The composition of claim 10 wherein $R^4$ is methyl, ethyl, propyl, butyl, phenyl or tolyl.

15. An optical fiber comprising an optical fiber core in the form of a cured product of the composition as set forth in claim 14.

16. The composition of claim 1 wherein the organopolysiloxane of component (a) comprises the following compositional formulae

[MeSiO$_{3/2}$]$_a$[MeViSiO]$_b$,
[PhSiO$_{3/2}$]$_a$[MeViSiO]$_b$,
[PhSiO$_{3/2}$]$_a$[MeSiO$_{3/2}$]$_b$[MeViSiO]$_c$,
[PhSiO$_{3/2}$]$_a$[ViSiO$_{3/2}$]$_b$[Me$_2$SiO]$_c$,
[PhSiO$_{3/2}$]$_a$[MeViSiO]$_b$[MePhSiO]$_c$,
[PhSiO$_{3/2}$]$_a$[MeViSiO]$_b$[Me$_3$SiO$_{1/2}$]$_c$[SiO$_2$]$_d$,
[PhSiO$_{3/2}$]$_a$[MeViSiO]$_b$[ViMe$_2$SiO$_{1/2}$]$_c$[SiO$_2$]$_d$,
[MeSiO$_{3/2}$]$_a$[MeViSiO]$_b$[HO$_{1/2}$]$_c$,
[PhSiO$_{3/2}$]$_a$[MeViSiO]$_b$[HO$_{1/2}$]$_c$,
[PhSiO$_{3/2}$]$_a$[MeSiO$_{3/2}$]$_b$[MeViSiO]$_c$[HO$_{1/2}$]$_d$,
[PhSiO$_{3/2}$]$_a$[ViSiO$_{3/2}$]$_b$[Me$_2$SiO]$_c$[HO$_{1/2}$]$_e$,
[PhSiO$_{3/2}$]$_a$[MeViSiO]$_b$[MePhSiO]$_c$[HO$_{1/2}$]$_e$,
[PhSiO$_{3/2}$]$_a$[MeViSiO]$_b$[Me$_3$SiO$_{1/2}$]$_c$[SiO$_2$]$_e$[HO$_{1/2}$]$_d$
or
[PhSiO$_{3/2}$]$_a$[MeViSiO]$_b$[ViMe$_2$SiO$_{1/2}$]$_c$[SiO$_{1/2}$]$_e$[HO$_{1/2}$]$_d$ wherein Me is methyl, Vi is vinyl, Ph is phenyl, letters a through e are positive numbers of less than 1, and the sum of letters a through e is equal to 1.0.

17. An optical fiber comprising an optical fiber core in the form of a cured product of the composition as set forth in claim 16.

18. The composition of claim 1 wherein the platinum of component (c) is platinum black or chloroplatinic acid.

19. An optical fiber comprising an optical fiber core in the form of a cured product of the composition as set forth in claim 18.

20. The composition of claim 1 which further comprises a reaction inhibitor selected from acetylene alcohols, 3-methyl-3-butyn-2-ol, 2-methyl-1-pentyl-3-ol, 3,5-dimethyl-1-hexyn- 3-ol, 2,5-dimethyl-3-hexyne-2,5-diol, 3,6-dimethyl-4-octyne-3,6-diol or 2,4,7,9-tetramethyl-5-decyne-4,7-diol in an amount of about 0.01 to 1 part per 100 parts by weight of the total of components (a) and (b).

21. An optical fiber comprising an optical fiber core in the form of a cured product of the composition as set forth in claim 20.

22. An optical fiber comprising an optical fiber core in the form of a cured product of the composition as set forth in claim 1 or 2 wherein the cured core product is formed by mixing components (a), (b) and (c), introducing the mixed components into a tube under pressure, and curing the pressurized mixed components by heat to form the cured core product.

23. An optical fiber comprising an optical fiber core in the form of a cured product of the composition as set forth in claim 1 or 2 and a cladding.

24. An optical fiber comprising an optical fiber core in the form of a cured product of the composition as set forth in claim 1 or 2 and a cladding, wherein the cladding is a fluorinated polymer which is comprised of polytetrafluoroethylene, tetrafluoroethylene/perfluoroalkylvinylether copolymer, tetrafluoroethylene/hexafluoropropylene copolymer, polychlorotrifluoroethylene, tetrafluoroethylene/ethylene copolymer, polyvinyl fluoride, polyvinylidene fluoride, and tetrafluoroethylene/vinylidene fluoride copolymer, polyamide resin, polyimide resin, polyamidimide resin, epoxy resin, polyvinyl chloride or polyester.

25. The composition of claim 1 wherein the organopolysiloxane of component (b) is selected from the following formulae:

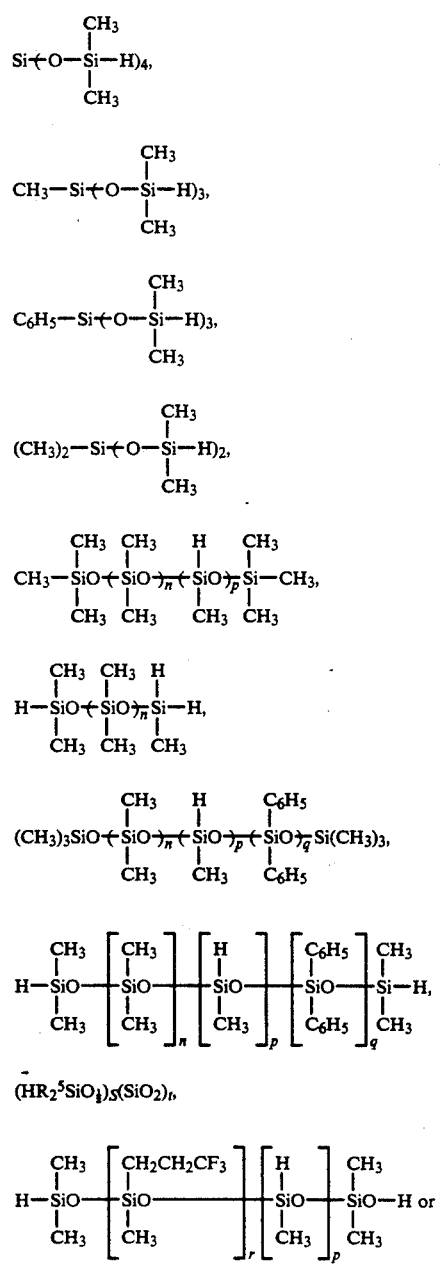

-continued

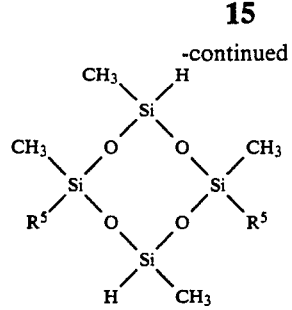

wherein s and t are positive numbers and the sum of s+t is equal to 1; $R^5$ is hydrogen, a monovalent $C_{1-8}$ hydrocarbon group, or a triorganosiloxy group, n, p, q and r are integers, $n \geq 0$, $p \geq 2$, $q \geq 0$, and $r \geq 0$, and n, n+p, n+p+q, and r+q are equal to 4 to 300.

26. An optical fiber comprising an optical fiber core in the form of a cured product of the composition as set forth in claim 25.

* * * * *